(12) United States Patent
Feulner

(10) Patent No.: US 11,068,466 B2
(45) Date of Patent: Jul. 20, 2021

(54) SYSTEMS AND METHODS FOR USE IN DATA STRUCTURE VALIDATION

(71) Applicant: MASTERCARD INTERNATIONAL INCORPORATED, Purchase, NY (US)

(72) Inventor: Kenneth Gene Feulner, Florissant, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 283 days.

(21) Appl. No.: 16/236,816

(22) Filed: Dec. 31, 2018

(65) Prior Publication Data

US 2020/0210403 A1 Jul. 2, 2020

(51) Int. Cl.
*G06F 16/20* (2019.01)
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
None
See application file for complete search history.

(56) References Cited

U.S. PATENT DOCUMENTS

| 6,367,012 B1* | 4/2002 | Atkinson | G06F 21/51 |
| | | | 713/167 |
| 7,451,325 B2* | 11/2008 | Aaron | G06F 21/86 |
| | | | 713/187 |
| 2003/0120932 A1* | 6/2003 | Epstein | H04L 9/12 |
| | | | 713/181 |
| 2010/0257149 A1* | 10/2010 | Cognigni | G06F 16/27 |
| | | | 707/698 |
| 2013/0197859 A1* | 8/2013 | Albano | G06K 9/00771 |
| | | | 702/150 |

* cited by examiner

*Primary Examiner* — Jau Shya Meng
(74) *Attorney, Agent, or Firm* — Harness, Dickey & Pierce, P.L.C.

(57) ABSTRACT

A method for validating data structures includes generating and storing, at each of multiple intervals, a signature for each of multiple data structures, including a parent data structure and a child data structure. The method also includes, in response to a request to validate the child data structure, retrieving active state signatures of the parent and child data structures, and comparing the active state signatures. The method further includes, when the active state signatures are inconsistent, comparing the active state signature of the child data structure to a first prior state signature of the parent data structure; and when the active state signature of the child data structure is consistent with the first prior state signature of the parent data structure, notifying a user that the child data structure is a match for the parent data structure but out of sync therewith.

15 Claims, 3 Drawing Sheets

SYSTEMS AND METHODS FOR USE IN DATA STRUCTURE VALIDATION

FIELD

The present disclosure generally relates to systems and methods for use in data structure validation, and in particular, to systems and methods for validating data structures based on signatures associated with the data structures, which are generated consistent with change intervals associated with the data structures.

BACKGROUND

This section provides background information related to the present disclosure which is not necessarily prior art.

Data is known to be stored into data structures, and further utilized for a variety of different operations which are dependent on the data. In connection therewith, the data structures may be copied and/or reproduced for each, or some, of the operations. The data structures may further be updated or changed from time to time, with new data, additional data, and/or, sometimes, corrected data stored thereto. When operations are initiated, based on data structures, errors in the data or outdated (or changed) data structures may provide errors in either reading the data into the operations and/or in any reports, summaries, aggregates or other results generated based on the operations.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

For operations by computing devices, as part of networks, or otherwise, relying on data structures, execution and/or results of the operations are generally dependent on data included in the data structures. When data included in the data structures is changed (e.g., at one or more regular intervals (e.g., hourly, daily, weekly, etc.), etc.) (e.g., as additional data is generated, as data is replaced, as data is updated, as data is reloaded, through errors in copying data structures, etc.), the data structures likewise change, i.e., the states of the data structures change. Thus, when separate, or the same, operations rely on data structures that are supposed to be the same (e.g., where the states of the data structures are actually in different states, etc.), execution of the operations may fail or results of the operations may be incorrect or errant. Uniquely, the systems and methods herein impose a signature-based validation of data structures, whereby the states of data structures are apparent. In particular, a signature is generated for each of a plurality of data structures in a data warehouse, for each state of the data structure (e.g., where the different states are associated with different time intervals, etc.). When one or more data structures (or data therein) are used, the signatures are used, by a validation engine, to determine whether the data included in the data structures are in sync and/or whether the data structures are errant based on a comparison of the signatures of the data structures to one or more signatures of a referenced data structure. In this manner, data structures are validated, prior to reliance on the data structures (or as the data structures are being relied on), to limit and/or eliminate reliance on out-of-sync or errant data within the data warehouse.

Figure 1:
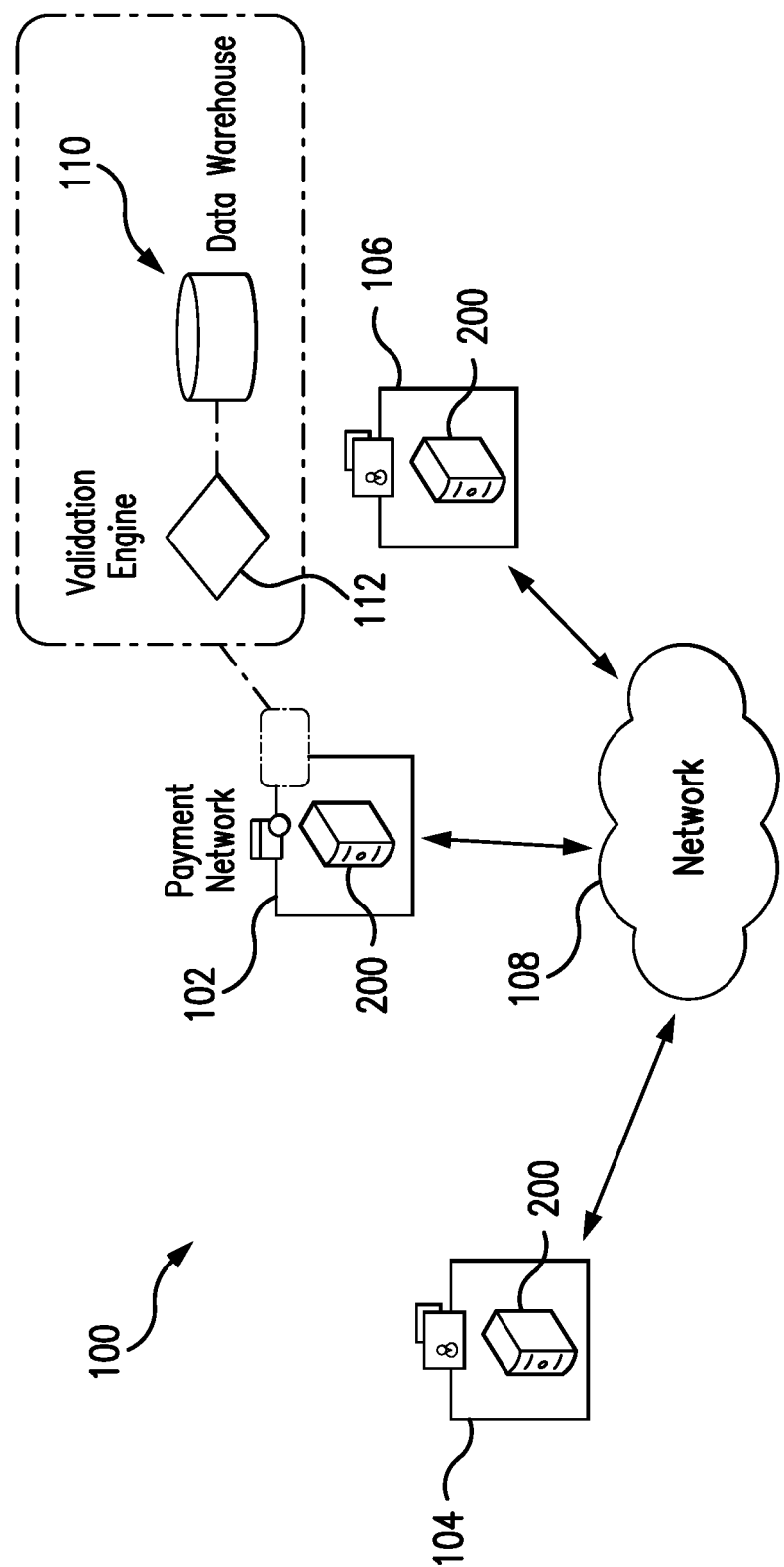
FIG. 1 illustrates an exemplary system for use in validating data structures based on signatures associated with the data structures, and including one or more aspects of the present disclosure.

FIG. 1 illustrates an exemplary system 100, in which one or more aspects of the present disclosure may be implemented. Although parts of the system 100 are presented in one arrangement, other embodiments may include the same or different parts arranged otherwise, depending, for example, on applications and/or services involved therein, data warehouses available for access, etc.

The illustrated system 100 generally includes a payment network 102 and institutions 104 and 106, each coupled to network 108. The network 108 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, the network 108 includes multiple networks, where different ones of the multiple networks are accessible to different ones of the illustrated components in FIG. 1. In particular, the payment network 102 and the institution 104 may be connected via a private network for processing transactions, and separately the payment network 102 may be connected to the institution 106 through a public network, such as the Internet.

Generally in the system 100, the institutions 104 and 106 are financial institutions, which provide financial services related to banking, lending, insurance, investment, etc. The institutions 104 and 106 may therefore rely on certain data from the payment network 102 to make business decisions or other decisions related to those financial services. With that said, while the institutions 104 and 106 are described as financial institutions herein, it should be appreciated that the institution may include any type of entity, institution, person, etc., which may request and/or rely on data from the payment network 102 (or from another entity). What's more, while described as implemented in the payment network 102, the present disclosure should not be understood to be limited to the payment network 102, or to payment networks in general, as other entities may be included in other system embodiments. In general, the present disclosure is applicable to entities that maintain or utilize a data warehouse and provide reports from the data warehouse, either internally or externally, to institutions thereof or other interested entities or perform operations on data in the data in the data warehouse.

As shown in FIG. 1, the payment network 102 of the illustrated system 100 generally includes, as indicated by the dotted lines, a data warehouse 110 and a validation engine 112.

The validation engine 112 is configured, by executable instructions, to perform one or more of the operations described herein. The validation engine 112 may be a standalone computing device, or integrated and/or incorporated with one or more other computing devices within the payment network 102. In at least one embodiment, the validation engine 112 is separate from and not included in the payment network 102. As indicated by the dotted line, the data warehouse 110 may be separate from the validation engine 112 (e.g., in one or more computing device, etc.), or integrated and/or incorporated therein.

In this exemplary embodiment, the data warehouse 110 is structured and/or configured to include a variety of data, which is organized into different data structures. In the example data warehouse 110, the data structures are maintained in a manner such that there are multiple sets of redundant data structures (broadly, redundancy sets), where each redundancy is generally intended to store the same data, whether that be by loading the same data into the each data structure in the redundancy set or duplicating a data structure into one or more other data structures, etc. However, as can be appreciated, there may be variances in the data due to a variety of reasons (e.g., due to human error as part of manually populating the data on a server; due to an interruption in the data load causing a fail, and a manual restart; due to data being pulled from a source table while it was being loaded, causing a faulty interim/partially loaded state; etc.). In any case, for each redundancy set, the data warehouse 110 includes a parent or reference data structure and one or more child data structures. It should be appreciated, that the parent or reference data structure is generally the data structure that is populated with data prior to the other data structures in the redundancy set. Further, as discussed in more detail below, the parent or reference data structure in a redundancy set (or signatures, IDs, hashes, etc. associated therewith) serves as a reference point for each of the child data structures in the redundancy set. For example, a first data structure (a parent data structure) in a particular redundancy set may include a listing of accounts, which, for each account, includes a row with columns for each of a primary account number (PAN), account type, name(s), address(es), etc. associated with the account. A second data structure (a child data structure) in the redundancy set then includes data that is generally redundant to the listing of accounts in the first parent data structure in the set, except for any discrepancies that may exist (e.g., being out of sync, or due to errors, interruptions, etc.). It should be appreciated that there may be any number of child data structures (third, fourth, fifth, sixth data structures, etc.) generally redundant to the first parent data structure.

As another example, a first parent data structure in a particular redundancy set may include a listing of banks, which, for each bank, includes a row with columns for each of a routing and transit number, associated bank name, and country of operation. A second child data structure in this redundancy set then includes data that is generally redundant to the listing of banks in the first parent data structure in the set, except for any discrepancies that may exist. In general, any data structure (e.g., table(s), etc.) that is replicated to more than one instance or stores data that is generally intended to be duplicative of data in another data structure (e.g., across different database platforms, etc.) may be a parent data structure in association with the replicate/duplicative child data structure(s), even where data is loaded into a data structure fully or partially (and randomly) without constraint.

For ease of illustration, the data structure may be referred to herein as tables, but it should be understood that other data structures may be included in the data warehouse 110 and may be the subject of the operations described herein.

In addition, the data included in the data warehouse 110 will include, generally, data related to the payment network 102, i.e., payment network data. The payment network data may include, for example, any data provided to, compiled by, or provided from the payment network 102 to/from the institutions 104 and/or 106. The payment network data may further include data that is retained within the payment network 102 and thus not shared with the institutions 104 and/or 106.

Given the type of data included in the data warehouse 110, it should be appreciated that the data structures in redundancy sets will change from time to time, as new data is added, data is altered, and/or data is deleted from the data structures. In some instances, data structures in redundancy sets may be continually changed, while other data structures in redundancy sets may be updated or refreshed at one or more intervals. For example, the transaction data structure referenced above may be updated once daily or twice daily, etc. When the data structures are changed, a state of the data structure (in time) should be understood to then be changed as well. So, a transaction data structure may be in a first state, and then, after being updated, may be in a second state, where the data included in the data structure is generally different. Or, the states may be defined by intervals associated with the data structures.

As should be appreciated, the data structures included in the data warehouse 110 are used, as needed or desired, as sources of data within the payment network 102. For example, clearing and settlement may rely on a transaction data structure in a particular redundancy set, while fraud prevention analytics may rely on one or more different data structures in the same redundancy set (e.g., a data structure storing transaction data intended to be redundant of the transaction data structure in the same redundancy set relied upon by clearing and settlement, etc.). With the payment network 102 relying on the data structure, it is important for the data structures in redundancy sets, and in particular parent and child data structures, to be in sync and/or in the same state to ensure propriety and/or effectiveness of the references between the data structures and/or to have intelligence regarding how far out of sync data structures in redundancy sets are with one another (e.g., so that any syncing issues can be corrected or accounted for, etc.).

In this exemplary embodiment, the validation engine 112 is configured to generate a unique identifier (ID), tag, checksum, or hash, etc. (broadly, a signature) of the state of each data structure in a redundancy set in the data warehouse 110, at a predetermined interval. It should be appreciated, however, that the data warehouse 110 may include multiple redundancy sets, and the validation engine 112 may be configured to operate as described herein with respect to each redundancy set, or multiple ones of the redundancy sets. However, for ease of description herein, the configuration of the validation engine 112 is described in relation to one redundancy set in the data warehouse 110.

With that said, in this exemplary embodiment, the predetermined interval is a daily interval configured into memory of the validation engine 112 based on how often the data structures of the redundancy set in the data warehouse 110 are generally refreshed. Specifically, for example, the validation engine 112 is configured to generate a signature of each data structure, or table in the redundancy set at the predetermined daily interval. The validation engine 112 may be configured to generate the signature, for each data structure in the redundancy set, by, for example, performing an operation on each field of the data structure and summing the result of each operation into an aggregate value. For instance, the validation engine 112 may be configured to perform a SUM( ) operation on each numeric field (or on each numeric aspect of a given field). For each character or string field (or for each character or sting aspect of a given field), the validation engine 112 may be configured to retrieve data bytes for the characters in the field and sum the ASCII code for each individual byte. For each date field, the validation engine 112 may be configured to perform a SUM ( ) operation (treating the date filed as a numeric field) and/or the validation engine 112 may be configured to retrieve data bytes for the characters in the date field and sum the ASCII code for each individual byte. Then, the validation engine 112 may be configured to aggregate (or sum) each of the individual sums, such that the output of the aforementioned algorithm makes up the signature. That said, it should be appreciated, however, that other suitable variations or algorithms may be used to generate the signature, for example, and without limitation, averages, means, hashes, cryptographs, etc. Further, when the signature is generated for a data structure, the validation engine 112 is configured to store the signature in memory cross-referenced to the data structure. Regardless, it should be appreciated that the signatures are generally defined by the data analyst, and potentially, combine key "signatures" from all fields required to be in sync (e.g., which may include all or less than all fields in a data structure, etc.).

Table 1 illustrates signatures generated by the validation engine 112 and stored in memory cross-referenced to corresponding data structures. Specifically, for example, Table 1 illustrates signatures generated at various states for exemplary data structure DS_1234, DS_2345, DS_3456, and DS_4567 in a particular redundancy set, where DS_1234 is a parent (or reference) data structure and each of the three other data structures are child data structures intended to be copied from the parent data structure and/or to store the same data as the parent structure (i.e., intended to be the same). For each of the data structures, a signature is generated and stored for the various states consistent with the above-described manner of generation.

TABLE 1

| State No. | DS_1234 | DS_2345 | DS_3456 | DS_4567 |
|---|---|---|---|---|
| 1 | 2657 | 2657 | 2657 | 2657 |
| 2 | 2660 | 2660 | 2660 | 2660 |
| 3 | 2658 | 2658 | 2655 | 2657 |
| 4 | 2659 | 2658 | 2655 | 2657 |
| ... | ... | ... | ... | ... |

Tables 2 and 3 illustrate data in example parent data structure DS_1234 in the redundancy set for which the signatures shown in Table 1 are illustrated in cross-reference to the various states or intervals. Specifically, for example, Table 2 illustrates the data in parent data structure DS_1234 at State No. 3, and Table 3 illustrates the data parent data structure DS_1234 at State No. 4. Child data structures DS_2345, DS_3456, and DS_4567 are similar except that, as can be appreciated based on the varying signatures, there are deviations in the data at the various states.

TABLE 2

State No. 3 for DS_1234

| Routing and Transit Number | Bin6 (identifying bank card number) | Bank Name | Country |
|---|---|---|---|
| 000000011 | 000011 | Bank ABC | USA |
| 000000012 | 000022 | Bank DEF | USA |
| 000000013 | 000033 | Bank GHI | USA |

TABLE 3

State No. 4 for DS_1234

| Routing and Transit Number | Bin6 (identifying bank card number) | Bank Name | Country |
|---|---|---|---|
| 000000011 | 000011 | Bank ABC | USA |
| 000000012 | 000023 | Bank DEF | USA |
| 000000013 | 000033 | Bank GHI | USA |

The signatures for parent data structure DS_1234 at State Nos. 3 and 4 are generated consistent with the description above in this example. For example, at State No. 3, the validation engine 112 is configured to perform a SUM( ) operation on the numerical fields (i.e., the Routing and Transit Number fields and the Bin6 fields), where the SUM ( ) operation yields an aggregate value of 102. The validation engine 112 is also configured to retrieve data bytes for the characters in the character or string fields (i.e., the Bank Name and Country fields) and sum the ASCII code for each individual byte (where each byte corresponds to a character), where the ASCII sum yields an aggregate value of 2556. The validation engine 10 is then configured to aggregate (or sum) each of these aggregate values (or sums), which yields a value of 2658, the signature of DS_1234 at State No. 3. The validation engine 112 is similarly configured to generate a signature for each data structure at each state or interval for the redundancy set illustrated in Table 1.

Subsequently, the validation engine 112 is configured to validate each child data structure in the redundancy set against the parent (or referential) data structure in the redundancy set. It should be appreciated, however, that where there is more than one child data structure in the redundancy set, the validation engine 112 may be configured to validate less than all child data structures (e.g., only one child data structure, etc.) against the parent data structure in the redundancy set. In any case, the validation engine 112 may be configured to validate the one or more child data structures in response to a request, for example, from a job scheduler which may either be separate from or internal to the validation engine 112. Such a request may initially include a request that data be collected from a source table in a first batch (thereby digging through the raw data and creating a "signature", and which may include a composite of upwards of fifty signatures). For example, the job scheduler may pull a table with five fields and create a signature of {23452134,12345,2535,2134342134,1431355}, which is then stored. Then, as part of the request, a second batch may be called that interprets the initial information and compares it to a signature from a different server. This second batch is a compare-type of job in which the job scheduler informs the validation engine 112 of the names of the jobs that make up the two signature sets to be compared, and of the signature sets to define as the parent. The validation engine 112 then goes through the lists, by day, for each set, and lines up the data and finds matches. With that said, in this example, the first batch involves defining a job name and server, and the second batch relates to the job name and server of the child, and the job name and server of the parent, as well as involves defining which of the two jobs is the parent and which is the child.

Specifically, for example, the job scheduler is configured to request that the validation engine 112 validate each child data structure in a redundancy set against the parent data structure in the redundancy set at one or more predetermined intervals (e.g., daily intervals), and the validation engine 112 is configured to receive that request. It should be appreciated, however, that where there is more than one child data structure in the redundancy set, the job scheduler may be configured to request that the validation engine 112 validate less than all child data structures (e.g., one child data structure, etc.) against the parent data structure in the redundancy set. It should also be appreciated that the job scheduler may be configured to evaluate one or more child data structures at other times, in the alternative or in addition to at the interval (e.g., in response to a request form a user, when data within the child data structure is required or desired, etc.). However, in the example system 100, the job scheduler is configured to automatically validate each child data structure in the redundancy set against the parent data structure at one or more regular daily intervals consistent with a regular daily interval after which the data structures in the redundancy set are generally scheduled to be refreshed, such that the data structures are generally validated after the refresh.

In connection with validating each child data structure in the redundancy set, the validation engine 112 is configured to determine (or identify) the most recently generated signature (broadly, the active state signature) of each child data structure in the redundancy set (broadly, each target data structure) and to determine the active state signature for the parent data structure (broadly, the reference data structure) in the redundancy set, potentially as well as each prior state signature of the parent and/or child data structures.

The validation engine 112 is configured to determine, for each child data structure, whether the child data structure matches the parent data structure and whether the child data structure is in sync, or not, with the parent data structure. The validation engine 112 is configured to determine a match between the child data structure and the parent structure based on the active state signature of the child data structure being consistent with (e.g., the same as) the active state signature or a prior state signature of the parent data structure. In one or more embodiments, the validation engine 112 may be configured to determine a match between a child data structure and the parent data structure based on a consistency between the active state signature of the child data structure and a prior state signature of the parent data structure, only when the prior state signature of the parent data structure is within a defined or maximum number of prior state signatures (e.g., a maximum number of intervals) of the parent data structure. Conversely, the validation engine 112 is configured to determine a non-match between the child data structure and the parent structure based on the active state signature of the child data structure being inconsistent with (e.g., not the same as, not an exact match to, etc.) either the active state signature of the parent data structure or a prior state signature of the parent data structure (in one or more embodiments, within a defined and/or maximum number of prior state signatures).

In addition, the validation engine 112 is configured to determine that the child data structure is in sync with the parent data structure based on the active state signature of the child data structure being consistent with (e.g., the same as) the active state signature of the parent data structure. The validation engine 112 is configured to determine that the child data structure is out of sync with the parent data structure based on the active state signature of the child data structure being inconsistent with the active state signature of the parent data structure. When the validation engine 112 determines that the child data structure is out of sync, the validation engine 112 is configured to determine the number of states by which the child data structure is out of sync with the parent data structure.

Specifically, for example, for the child data structure DS_2345, the validation engine 112 is configured to retrieve the signature as 2655 for the active state of the data structure DS_2345, which corresponds to State No. 4 in Table 1. The validation engine 112 is configured to then compare the active state signature to the active state signature of the parent data structure DS_1234, which corresponds to State No. 4. in Table 1. The validation engine 112 is configured to determine, based on the comparison, that the active state signature of child data structure DS_2345 (here, 2658) is inconsistent with the active state signature of the parent data structure DS_1234 (here, 2659). The validation engine 112, then, is configured to determine that the child data structure is out of sync, based on the determination that the active state signature of the child data structure DS_2345 is inconsistent with the active state signature of the parent data structure DS_1234.

Continuing with the above example, to determine whether the child data structure DS_2345 nevertheless matches the parent data structure DS_1234 (despite being out of sync), the validation engine 112 is configured to determine whether the active state signature for the child data structure DS_2345 is consistent with (e.g., the same as) a prior state signature for the parent data structure DS_1234 (here, one of prior state signatures 2658, 2660, or 2657 corresponding to prior State Nos. 3, 2, and 1, respectively). In connection therewith, the validation engine 112 is configured to compare the active state signature of the child data structure DS_2345 (here, 2658) with each of the prior state signatures of the parent data structure DS_1234 in descending order (from the most recent prior state (here, State No. 3) to the oldest prior state (here, State No. 1) until the validation engine 112 determines a consistency (e.g., an exact match) between the active state signature of the child data structure DS_2345 and one of the prior state signature of the parent data structure DS_1245, or until the validation engine 112 determines there are no prior state signatures of the parent data structure DS_1234 left to compare (whichever occurs first) (or after exhausting a defined and/or maximum number of states).

If the validation engine 112 determines a match between active state signature of the child data structure DS_2345 and a prior state signature of parent data structure DS_1234, then the validation engine 112 is configured to stop the descending comparison of the active state signature of the child data structure DS_2345 to the prior state signatures of the parent data structure DS_1234. For example, the validation engine 112 is configured to determine that the active state data signature for the child data structure DS_2345 (here, 2658) is consistent with the prior state signature 2658 for the parent data structure DS_1234, which corresponds to State No. 3. Based on this determination, the validation engine 112 is configured to determine that the child data structure DS_2345 matches the parent data structure DS_1234, notwithstanding the fact that the validation engine 1234 determined the child data structure DS_2345 to be out of sync with the parent data structure DS_1234. The validation engine is then configured to stop the comparison of the active state signature of the child data structure DS_2345 with the prior states of the parent data structure DS_1234. The validation engine 112 is also configured to determine the number of states by which the child DS_2345 data structure is out of sync with the parent data structure DS_1234, which in this example is one state (e.g., one interval (e.g., one day, etc.), etc.) As such, the validation engine 112 is configured to determine that the data in the child data structure DS_2345 is one state and/or interval (e.g., one day, etc.) out of sync relative to the parent data structure DS_1234, but still matches the parent data structure based on the consistency with the prior state signature.

As another example, for child data structure DS_3456, the validation engine 112 is configured to identify the active state signature as 2655. The validation engine 112 is configured to compare the active state signature of child data structure DS_3456 with the active state signature for the parent data structure DS_1234. Based on the comparison, the validation engine 112 is configured to determine that the active state signature for the child data structure DS_3456 is not consistent with (e.g., not the same as) the active state signature for the parent data structure DS_1234. Based on the determination, the validation engine 112 is configured to determine that the child data structure DS_3456 is out of sync with the parent data structure DS_1234.

The validation engine 112 is configured to determine whether the child data structure DS_3456 matches with the parent data structure DS_1234. In connection therewith, the validation engine 112 is configured to compare the active state signature of the child data structure DS_3456 (here, 2655) with each of the prior state signatures of the parent data structure DS_1234 in descending order (from the most recent prior state (here, State No. 3) to the oldest prior state (here, State No. 1)) until the validation engine 112 determines a consistency between the active state signature of the child data structure DS_3456 and one of the prior state signature of the parent data structure DS_1245, or until the validation engine 112 determines there are no prior state signatures of the parent data structure DS_1234 left to compare (whichever occurs first) (or after exhausting a defined and/or maximum number of states). As is apparent from Table 1, no consistency based on an exact match will be determined for any of the signatures (active state or prior state) for the parent data structure DS_1234, whereby the validation engine 112 is configured to determine that the child data structure DS_3456 is unmatched or mismatched with the parent data structure DS_1234, thereby indicating a potential error in the data, where the error is not merely that the data structures DS_1234 and DS_3456 are out of sync. That said, it should be appreciated that numerous conclusions may be drawn from the match and/or mismatch of signatures for the data structures across the different states.

With continued reference to FIG. 1, the validation engine 112 is configured to provide one or more notifications (e.g., emails, etc.) based on the determination that a child data structure in a redundancy set (e.g., child data structure DS_3456) does not match the parent data structure in the redundancy set (e.g., parent data structure DS_1234) (e.g., as discussed above, based on the determination that the active state signature for the child data structure is inconsistent with the active state signature or any prior state signature of the parent data structure). In one or more embodiments, when the validation engine 112 determines that a child data structure (e.g., child data structure DS_2345) matches the parent data structure in a redundancy set (e.g., parent data structure DS_1245) but is out of sync (e.g., is more than X intervals (e.g., days) out of sync) with the parent data structure, the validation engine 112 may be configured to provide one or more notifications identifying the number of states and/or intervals by which the child data structure is out of sync with the parent data structure (e.g., one state or interval (e.g., one day) in the example for DS_1234 and DS_2345 discussed above in relation to Table 1). In connection therewith, the validation engine 112 may provide the notification(s) directly to a user that executed the batch, to a particular user, to a job scheduler or user associated therewith, to a common email folder (supported by users associated with the data structure), to a distribution list defined in an email file, etc.

The validation engine 112 may also be configured to provide one or more notifications when a signature for a data structure (either a parent or child data structure) has not changed for more than a predetermined number of states or intervals (e.g., four days). In connection therewith, each time the validation engine 112 generates a signature for a particular data structure, the validation engine 112 may be configured compare the generated signature for that data structure with each prior state signature for that data structure up to a maximum number of prior states or intervals (e.g., three days), to determine whether the signature for the data structure has not changed. If the validation engine 112 determines that there has not been a change within the predetermined number of states number of states or intervals, the validation engine 112 may be configured to provide a notification (e.g., an email, etc.) indicating that the data structure has not been updated in the predetermined number of states or intervals. In connection therewith, and as above, the validation engine 112 may provide the notification(s) directly to a user that executed the batch, to a particular user, to a common mail folder (supported by an entire team), to a distribution list defined in a mail file, etc.

While only one payment network 102 and two institutions 104 and 106 are illustrated in the system 100 in FIG. 1 (for ease of reference), it should be appreciated that the system 100, and/or other system embodiments of the present disclosure, may include multiple ones of one or more of these parts in various combinations (as well as one or more additional parts).

Figure 2:
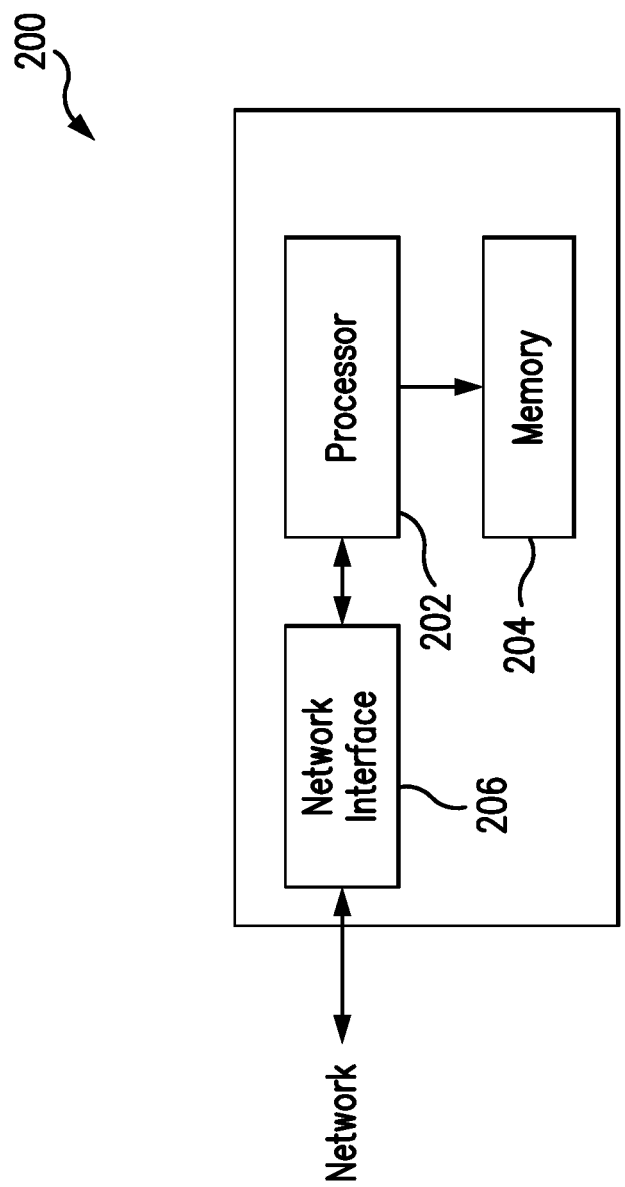
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the exemplary embodiment of FIG. 1, each of the payment network 102 and the institutions 104 and 106 are illustrated as including, or being implemented in, computing device 200, coupled to the network 108. In addition, data warehouse 110 and/or the validation engine 112 may each be considered a computing device, or may be considered implemented in a computing device, consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read-only memory (ROM), erasable programmable read-only memory (EPROM), solid state devices, flash drives, CD-ROMs, thumb drives, floppy disks, tapes, hard disks, and/or any other type of volatile or nonvolatile physical or tangible computer-readable media. The memory 204 may also include one or more data structures (e.g., as associated with the data warehouse 110, the data structures therein, etc.), and may further be configured to store, without limitation, transaction data, signatures, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. Such instructions often improve the efficiencies and/or performance of the processor 202 and/or other computer system components as specifically configured by the instructions to perform one or more of the various particular and unique operations herein. It should be appreciated that the memory 204 may include a variety of different memories, each implemented in one or more of the functions or processes described herein.

In addition, the illustrated computing device 200 includes a network interface 206 coupled to the processor 202 and the memory 204. The network interface 206 may include, without limitation, a wired network adapter, a wireless network adapter, a mobile network adapter, or other device capable of communicating to one or more different networks, including the network 108. Further, in some exemplary embodiments, the computing device 200 includes the processor 202 and one or more network interfaces incorporated into or with the processor 202.

Figure 3:
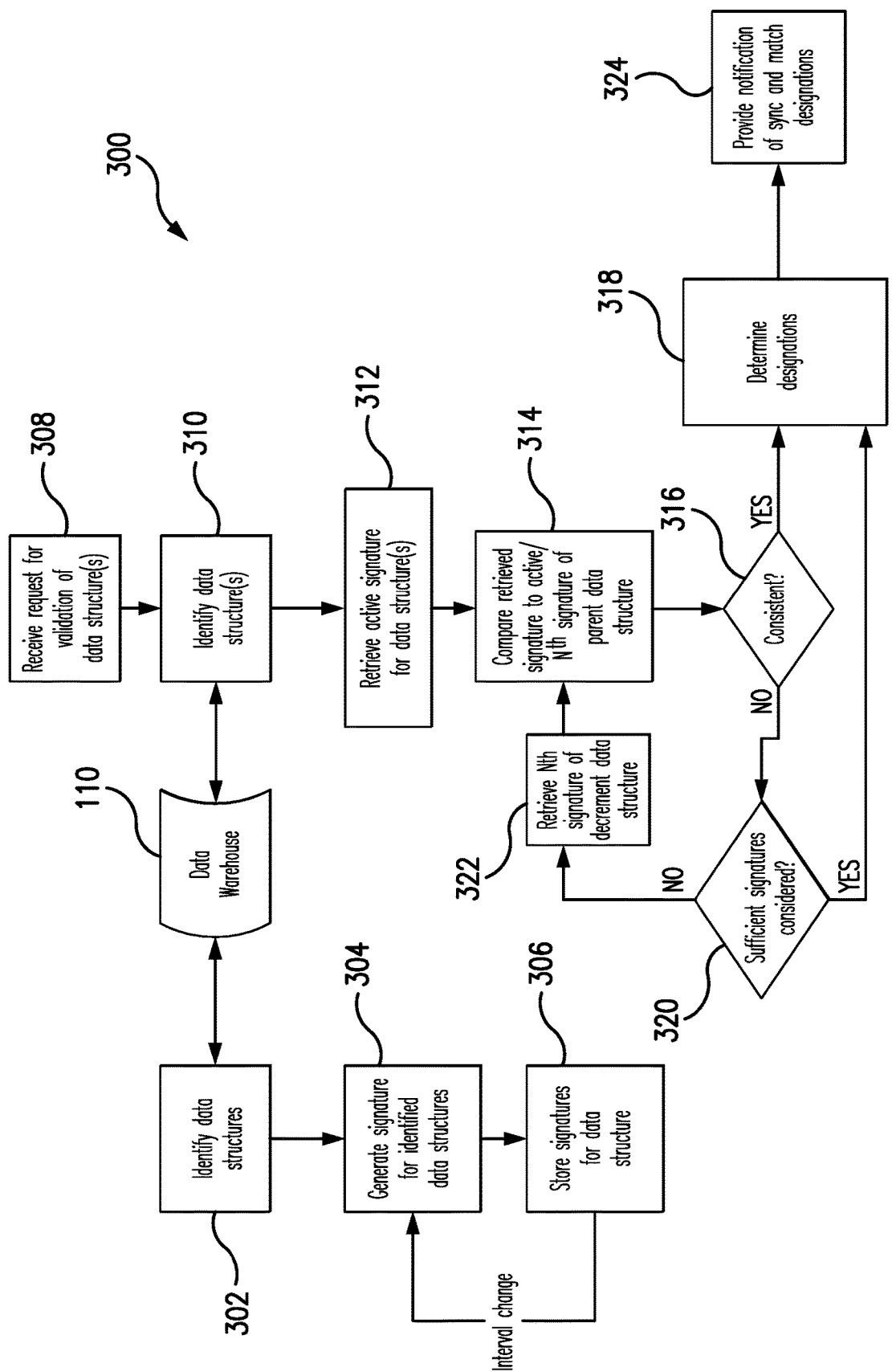
FIG. 3 is an exemplary method of validating a data structure, based on one or more signatures associated with the data structure, per interval associated with changes to the data structure, and which can be implemented via the system of FIG. 1.

FIG. 3 illustrates an exemplary method 300 for validating data structures based on signatures associated with the data structures in a redundancy set. The exemplary method 300 is described (with reference to FIG. 1) as implemented in the data warehouse 110 and validation engine 112 of the payment network 102 (in the system 100), and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

Initially in the method 300, the validation engine 112 identifies each data structure in a redundancy set within the data warehouse 110, for example, by name or identifier, at 302, and then generates a signature for each data structure, at 304. The validation engine 112 may generate the signature of each data structure, consistent with the generation of the signature, ID, tag, checksum, or hash, etc. described above in relation to exemplary system 100 of FIG. 1. In one example, each of the data structures in the redundancy set shown above in Table 1 is identified by the validation engine 112, and the validation engine 112, initially for State No. 1, generates a signature of each of parent data structure DS_1234 and child data structures DS_2345, DS_3456, and DS_4567, as also shown above in Table 1. The validation engine 112 further stores, at 306, the generated signatures in memory (e.g., the memory 204 associated with the validation engine 112, etc.).

In general, as indicated in FIG. 3, the validation engine 112 repeats the generation and storage of the signatures, at 304 and 306, at one or more predetermined intervals (e.g., a daily interval). The predetermined interval may be programmed into the validation engine 112 and generally corresponds to an interval at which the data structures in the redundancy state are intended or expected to be refreshed and/or updated (e.g., a daily interval), such that the state of the data structures in the redundancy set is generally changed, or at least generally expected to change, according to the interval. Specifically, for example, when the parent data structure DS_1234 is refreshed and/or updated on a daily basis, for example, once per day, the validation engine 112 then generates and stores, at 304 and 306, a new signature in correspondence with a State No. for the parent data structure DS_1234 in memory, such as in a signature data structure (e.g., similar to Table 1, etc.). This is repeated for each of the child data structures in the redundancy set included in the data warehouse 110 and specifically, for example, child data structures DS_2345, DS_3456, and DS_4567. As such, by method 300, a signature is generated and stored, at 304 and 306, for each data structure in the redundancy set, whereby a sequence of signatures for each data structure in the redundancy set in the data warehouse 110 is maintained. Specifically, for example, a sequence of signatures for parent data structure DS_1234 and child data structures DS_2345, DS_3456, and DS_4567 of the redundancy set in data warehouse 110 is generated and stored over multiple daily intervals corresponding to State Nos. 1-4 as shown above in Table 1. Accordingly, the data warehouse 110 includes an active state signature, a first prior state signature, a second prior state signature, etc., for each of the data structures in the redundancy set. It should be understood therefore that the data warehouse 110 may include N total signatures for a given data structure, where N is an integer.

Separately, the validation engine 112 receives, at 308, a request (e.g., from a job scheduler) to validate one or more child data structures (broadly, one or more target data structures), for example, one or more of child data structures DS_2345, DS_3456, and DS_4567, as referenced in Table 1, which are stored in the data warehouse 110 as child data structures as part of a redundancy set to which parent data structure DS_1234 belongs. It should be appreciated that the request may be directed to another computing device and/or engine within the payment network 102, but forwarded and/or provided to the validation engine 112 for the validation engine 112 to operate as described herein. The validation engine 112 then identifies, at 310, the one or more data structures associated with the request. In this example, the validation engine 112 identifies the data structures that are the subject of the received request: DS_2345, DS_3456, and DS_4567 (as shown in Table 1), each of which is a child to the parent data structure DM_1234.

Thereafter, for the first child data structure DS_2345, the validation engine 112 retrieves, at 312, the active state signature for the child data structure DS_2345, which is 2658 for State No. 4 as shown in Table 1, and the active state signature for the parent data structure DS_1234. The validation engine 112 then compares, at 314, the retrieved active state signature for the child data structure DS_2345 to the active state signature for the parent data structure DM_1234 (which is 2659 for State No. 4 as shown in Table 1). If the signatures were determined by the validation engine 112 to be consistent (e.g., the same), at 316, the validation engine 112 would determine, at 318, a sync and match designation for the child data structure DS_2345 (and, potentially, the parent data structure DS_1234), as the active states for both are synced and matched.

However, in this example, because the signatures are determined not to be consistent, at 316, and the validation engine 112 determines, at 320, that there are one or more prior state signatures for the parent data structure DS_1234 (i.e., N prior state signatures, where N is an integer (e.g., 3 for the data structure DS_2345 in Table 1, etc.)) that have not yet been compared, at 314 (e.g., all prior state signature or a defined number or maximum number of prior state signatures, etc.), to the active state signature of the child data structure DS_2345, the validation engine 112, at 322, starts with the first prior state signature for the parent data structure DS_1234 and retrieves the first prior state signature of the parent data structure DS_1234 (i.e., 2658 for State No. 3 as shown in Table 1). The validation engine 112 then compares the active state signature for the child data DS_2345 structure to the first prior state signature (i.e., the M-th prior state signature where M=1), at 314. When the signatures are determined by the validation engine 112, at 316, to be consistent (e.g., the same), as here, the validation engine 112 determines, at 318, that the child data structure DS_2345 is out of sync with, but matched to the parent data structure DS_1234. A designation then indicates that the child data structure DS_2345 is one (1) state out of sync but is still a match for the parent data structure DM_1234 (i.e., the data in DS_2345 is not necessarily errant, but is not up-to-date as compared to the parent data structure DS_1234).

The validation engine then, at 324, may, or may not, provide a notification of this designation. Where a notification is provided, the validation engine 112 may include in the notification, for example, including a designation that the child data structure DS_2345 matches the parent data structure DS_1234 but is one (1) state out of sync with the parent data structure DS_1234. However, in some embodiments, the validation engine 112 may only provide a notification, at 324, when it is determined, at 318, that the child data structure is unmatched or mismatched with the parent data structure (as discussed below in connection with DS_3456). In addition, in one or more embodiments, the validation engine 112 may also be configured to provide a notification, at 324, when it is determined that the child data structure is more than a predefined threshold number of states or intervals (e.g., three days) out of sync with the parent data structure. For example, where the data warehouse 110 includes L prior signatures for the parent data structure DS_1234, a predefine threshold number of prior state signature, e.g., N, may be employed, where N is less than L, whereby only 1-N of the 1-L prior state signature is compared by the validation engine 112 (i.e., whereupon when there is not match, the child data structure is determined to be out of sync and mismatched). Regardless of whether notification is provided, steps 312, 314, 316, 318, 320, and/or 322 are then repeated as appropriate with respect to each remaining child data structure identified at step 310 (e.g., DS_3456 and DS_4567). In the exemplary method 300, the validation engine 112 only provides a notification, at 324, when it is determined that that the child data structure is mismatched or unmatched to the parent data structure.

Further, it should be appreciated that, in one or more embodiments, any notification to be provided at step 324 may be delayed until steps 312, 314, 316, 318, 320, and/or 322 are repeated for each child data structured identified at step 310 and provided, e.g., as one notification.

With reference to the data structure DS_3456, the method 300 repeats with respect to steps 312, 314, 316, 318, 320, and/or 322 as described above, with the validation engine 112 comparing, at 314, the retrieved active state signature of the child state structure DS_3456 to the retrieved active state signature of the parent data structure DS_1234, the first prior state signature of the parent data structure DS_1234 (where M=1 for State No. 3), the second prior state signature of the parent data structure DS_1234 (where M=2 for State No. 2), and the third prior state signature (where M=3 for State No. 1), until each of the signatures of the parent data structure DS_1234 is compared to the retrieved active state signature of the child data structure DS_3456. As apparent from Table 1 there is no state signature of the parent data structure DS_1234, which is consistent with the active state signature of the child data structure DS_3456. As such, after the validation engine 112 determines that there is no consistency between the active state signature of the child data structure DS_3456 and each of the state signatures for the parent data structure DS_1234, the validation engine 112 determines, at 320, that all signatures for the parent data structure have been considered. The validation engine 112 then determines, at 318, a designation for the child data structure DS_3456 as out of sync and mismatched with respect to the parent data structure DS_1234. This indicates an issue with the data in the data structure DS_3456 has occurred, beyond the data structure merely being out of sync, and should be addressed and/or remedied. The validation engine 112 then provides a notification, at 324, with the designation that the child data structure is mismatched or unmatched and out of sync with the parent data structure DS_1234.

With reference to the data structure DS_4567, the validation engine 112 has retrieved, at 312, the active state signature for the child data structure DS_4567, which is 2657 for State No. 4 as shown in Table 1, and the active state signature for the parent data structure DS_1234, which is 2659 at State No. 4 as shown in Table 1. The validation engine 112 then compares, at 314, the retrieved active state signature of the child data structure DS_4567 to the active state signature for the parent data structure DM_1234. If the signatures were determined by the validation engine 112 to be consistent, at 316, the validation engine 112 would determine, at 318, a sync and match designation for the child data structure DS_2345 (and, potentially, the parent data structure) as in sync and matched. However, because the validation engine 112 determines that the signatures are not consistent (e.g., are not the same), at 316, and the validation engine 112 determines, at 320, that a sufficient number of state signatures have not yet been considered, the validation engine 112, at 322, retrieves a first prior state signature of the parent data structure DS_1234 (2658 for State No. 3 as shown in Table 1).

The validation engine 112 then compares the active state signature for the child data structure DS_4567 to the first prior state signature (i.e., M=1), at 314. Because the signatures are still not consistent (e.g. are not the same), at 316, and the validation engine 112 determines, at 320, that there are still prior state signatures for the parent data structure DS_1234 that have not yet been compared (broadly, that all signatures have not been considered), at 314, to the child data structure DS_4567, the validation engine 112, at 322, again retrieves a next prior state signature, i.e., the second prior state signature, of the parent data structure DS_1234 (2660 for State No. 2 as shown in Table 1).

The validation engine 112 then again compares the active state signature for the child data structure DS_4567 to the second prior state signature (i.e., M=2), at 314. Because the signatures are inconsistent, at 316, and the validation engine 112 determines, at 320, that there are one or more prior state signatures for the parent data structure DS_1234 that have not yet been compared, at 314, to the child data structure DS_4567, the validation engine 112, at 322, once more retrieves the next prior state signature, which is the third prior state signature (i.e., M=3) of the parent data structure DS_1234 (2657 for State No. 1 as shown in Table 1).

The validation engine 112 then again compares the active state signature for the child data DS_4567 structure to the third prior state signature, at 314. The signatures are determined by the validation engine 112, at 316, to be consistent, whereby validation engine 112 determines, at 318, a designation for the child data structure DS_4567 that the data structure is three (3) state out of sync but is still a match for the parent data structure DM_1234 (i.e., the data in DS_4567 is not necessarily errant, but is not up-to-date as compared to the parent data structure DS_1234).

Again, the validation engine 112 may only provide a notification, at 324, when it is determined, at 318, that the child data structure is unmatched or mismatched with the parent data structure (as discussed below in connection with DS_3456). However, in one or more embodiments, the validation engine 112 may be configured to provide a notification, at 324, when it is determined that the child data structure is more than a predetermined number of states or intervals (e.g., two days) out of sync with the parent data structure. In these embodiments, where the predetermined number of states or intervals is two (e.g., two days), the validation engine 112, at 324, provides notification that the child data structure DS_4567 is matched with the parent data structures DS_1234 but three states or intervals (e.g., three days) out of sync with the parent data structure DS_1234.

With that said, in the method 300, the validation engine 112 generally retrieves multiple state signatures for the parent data structure (including an active state signature and N total prior state signatures) and then compares the retrieved state signatures to the active state signature of the given child data structure until a match is found. As described above, the validation engine 112 may retrieve one state signature for the parent data structure at a time and compare it to the active state signature of the given child data structure. Or, the validation engine 112 may retrieve multiple state signatures for a data structure at one time, and thereafter compare the state signatures one at a time. Specifically, for example, at 312 or 320 in the method 300, the validation engine 112 may retrieve all available state signatures for the parent data structure DS_1234, i.e., the active state signature and first through third prior state signatures (where N=3). Then, in comparing the active state signature of the child data structure DS_2345 to the state signatures of the parent data structure DS_1234, the validation engine 112 determines that the first prior state signature matches the active state signature of the child data structure DS_2345 (such that M=1).

It should be appreciated that the sync and match analysis provided herein may be extended to a prior state signature of the child data structure, whereby a prior synced and/or matched state of the child data structure may be identified to aid one or more users in addressing the out of sync, mismatch designation of the child data structure. For example, with reference to Table 1, the validation engine 112 may repeat steps 312, 314, 316, 318, 320, and/or 322 with the first prior state signature, second prior state signature, etc., of the child data structure DS_3456. In doing so, the validation engine 112 would determine that the child data structure DS_3456 was in sync and matched to the parent data structure in State No. 2. As above, a notification may be provided from the validation engine 112 to one or more user indicating this designation for the child data structure DS_3456, potentially, to aid in remedying the mismatch, etc.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) for each of multiple data structures, generating and storing, by at least one computing device, at each of multiple intervals, a signature of the data structure, the multiple data structures defining a redundancy set and including a parent data structure and at least one child data structure, the signatures of each of the multiple data structures including an active state signature and one or more prior state signatures each for a different one of the multiple intervals; (b) in response to a request to validate the at least one child data structure, retrieving the active state signature of the parent data structure and the active state signature of the at least one child data structure; (c) comparing, by the at least one computing device, the retrieved active state signatures; (d) when the retrieved active state signatures are inconsistent, comparing, by the at least one computing device, the retrieved active state signature of the at least one child data structure to a first prior state signature of the parent data structure; and (e) when the retrieved active state signature of the at least one child data structure is consistent with the first prior state signature of the parent data structure, notifying, by the at least one computing device, at least one user associated with the request that the at least one child data structure is a match for the parent data structure but out of sync with the parent data structure.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in validating data structures based on signatures associated with the data structures, the method comprising:
    for each of multiple data structures, generating and storing, by at least one computing device, at each of multiple intervals, a signature of the data structure, the multiple data structures defining a redundancy set and including a parent data structure and at least one child data structure, the signatures of each of the multiple data structures including an active state signature and one or more prior state signatures each for a different one of the multiple intervals;
    in response to a request to validate the at least one child data structure, retrieving the active state signature of the parent data structure and the active state signature of the at least one child data structure;
    comparing, by the at least one computing device, the retrieved active state signatures;
    in response to the retrieved active state signatures being inconsistent, comparing, by the at least one computing device, the retrieved active state signature of the at least one child data structure to a first prior state signature of the parent data structure; and
    in response to the retrieved active state signature of the at least one child data structure being consistent with the first prior state signature of the parent data structure, notifying, by the at least one computing device, at least one user associated with the request that the at least one child data structure is a match for the parent data structure, but out of sync with the parent data structure.

2. The computer-implemented method of claim 1, wherein generating the signature of the data structure, for each of the multiple data structures, includes generating a sum of at least a portion of one or more data fields of the data structure.

3. The computer-implemented method of claim 1, wherein generating the signature of the data structure, for each of the multiple data structures, includes summing values of each numerical field included in the data structure.

4. The computer-implemented method of claim 3, wherein generating the signature of the data structure, for each of the multiple data structures, includes:
    for each character or string field of the data structure, retrieving data bytes for characters included in the character or string fields and summing ASCII code associated with each data byte, and
    aggregating the summed values of each numerical field with the summed ASCII code.

5. The computer-implemented method of claim 1, further comprising, in response to the retrieved active state signatures being consistent, providing a notification that the at least one child data structure is synced and matched.

6. The computer-implemented method of claim 1, further comprising:
    in response to the retrieved active state signature of the at least one child data structure being inconsistent with the first prior state signature of the parent data structure, comparing, by the at least one computing device, the retrieved active state signature of the at least one child data structure to a second prior state signature of the parent data structure; and
    in response to the retrieved active state signature of the at least one child data structure being consistent with the second prior state signature of the parent data structure, notifying, by the at least one computing device, the at least one user associated with the request that the at least one child data structure is a match for the parent data structure but is two states out of sync with the parent data structure.

7. The computer-implemented method of claim 6, further comprising:
  in response to the retrieved active state signature of the at least one child data structure being inconsistent with the second prior state signature of the parent data structure, comparing, by the at least one computing device, the retrieved active state signature of the at least one child data structure to one or more additional prior state signatures of the parent data structure; and
  in response to the retrieved active state signature of the at least one child data structure being inconsistent with each of the one or more additional prior state signatures of the parent data structure, notifying, by the at least one computing device, the at least one user associated with the request that the at least one child data structure is mismatched and out of sync with the parent data structure.

8. The computer-implemented method of claim 1, wherein notifying the at least one user includes transmitting an email to the at least on user.

9. A system for use in validating data structures based on signatures associated with the data structures, the system comprising:
  a non-transitory storage memory including at least an active state signature for a parent data structure, multiple prior state signatures for the parent data structure, and an active state signature for a child data structure, the parent data structure and the child data structure forming at least part of a redundancy set; and
  a processor coupled to the non-transitory storage memory; the non-transitory storage memory including executable instructions, which when executed by the processor, cause the processor to:
    retrieve and compare the active state signature for the parent data structure and the active state signature for the child data structure;
    in response to the retrieved active state signatures being inconsistent, compare the retrieved active state signature for the child data structure to N prior state signatures for the parent data structure, wherein N is an integer; and
    in response to the retrieved active state signature for the child data structure being consistent with an M-th one of the N prior state signatures for the parent data structure, where M is an integer and less than or equal to N, provide a notification including a designation that the child data structure is out of sync with, but matched to, the parent data structure.

10. The system of claim 9, wherein the designation that the child data structure is out of sync with, but matched to, the parent data structure includes an indication that the child data structure is M states out of sync with the parent data structure.

11. The system of claim 9, wherein the executable instructions, when executed by the processor, cause the processor to generate the active state signature for the parent data structure.

12. The system of claim 11, wherein the executable instructions, when executed by the processor, cause the processor, in order to generate the active state signature for the parent state structure, to sum each numeric value for at least a portion of numeric fields included in the parent data structure.

13. The system of claim 9, wherein the executable instructions, when executed by the processor, cause the processor, in response to the retrieved active state signature for the child data structure being inconsistent with the N prior state signatures for the parent data structure, to provide a notification including a designation that the child data structure is out of sync with and mismatched to the parent data structure.

14. The system of claim 9, wherein the executable instructions, when executed by the processor, further cause the processor, in response to the retrieved active state signatures being consistent, to provide a notification including a designation that the child data structure is synced and matched to the parent data structure.

15. The system of claim 9, wherein the memory includes L prior signatures for the parent data structure, where L is greater than N and where N is a predefined threshold; and
  wherein the executable instructions, when executed by the processor, cause the processor to, in response to the retrieved active state signatures being inconsistent, compare the retrieved active state signature for the child data structure to up to N prior state signatures for the parent data structure, but not beyond the N prior signature of the parent data structure.

* * * * *